United States Patent [19]

Hiestand et al.

[11] 4,135,028

[45] Jan. 16, 1979

[54] PROCESS FOR FIREPROOFING SYNTHETIC FIBER MATERIALS WITH SULPHONAMIDES

[75] Inventors: Armin Hiestand, Binningen; Peter Rohringer, Schönenbuch, both of Switzerland

[73] Assignee: Ciba-Geigy Corporation, Ardsley, N.Y.

[21] Appl. No.: 808,005

[22] Filed: Jun. 20, 1977

[30] Foreign Application Priority Data

Jun. 25, 1976 [CH] Switzerland .................. 8154/76

[51] Int. Cl.² .................. B32B 27/36; B05D 3/02; C09D 5/18; C09K 3/28
[52] U.S. Cl. .................. 428/253; 428/272; 428/395; 428/921; 427/390 D; 8/130.1; 260/45.9 R; 106/15 FP; 252/8.1
[58] Field of Search .............. 427/390 D; 106/15 FP; 8/130.1; 428/267, 265, 395, 253, 272, 921; 260/45.9 R, 301; 252/8.1

[56] References Cited

U.S. PATENT DOCUMENTS

| | | |
|---|---|---|
| 3,536,674 | 10/1970 | D'Alelio et al. .................. 260/78 A |
| 3,560,512 | 2/1971 | Skorcz et al. .................. 260/301 |
| 3,669,977 | 6/1972 | Tesoro .................. 260/301 |
| 3,783,018 | 1/1974 | Roth .................. 106/15 FP |
| 3,915,931 | 10/1975 | Gilleo et al. .................. 260/45.9 R |
| 4,057,555 | 11/1977 | Koike et al. .................. 260/301 |

*Primary Examiner*—Donald E. Czaja
*Assistant Examiner*—Maria S. Tungol
*Attorney, Agent, or Firm*—Edward McC. Roberts; Prabodh I. Almaula

[57] ABSTRACT

A process for fireproofing polyester fibers in which a sulphonamide of the formula

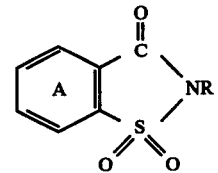

in which R is an aromatic, cycloaliphatic or aliphatic radical or hydrogen and in which the ring A is unsubstituted or further substituted or in which a hydrazonium or ammonium salt of such a sulphonamide is applied to the fiber material which is then dried and subjected to a heat treatment. The sulphonamide may also be applied in the presence of a dispersant, a protective colloid and/or water. The composition of matter for performing this process is also provided.

12 Claims, No Drawings

PROCESS FOR FIREPROOFING SYNTHETIC FIBER MATERIALS WITH SULPHONAMIDES

The invention relates to a process for fireproofing fiber materials made from polyamide or, in particular, polyester, in which process these materials are treated with a preparation containing at least one sulphonamide of the formula

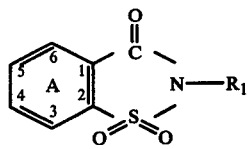
(1)

wherein $R_1$ represents phenyl substituted by ethyl or preferably methyl or by sulphonamido or carboxylamido, or unsubstituted phenylethyl, benzyl or cyclohexyl, alkyl which has 1 to 8 carbon atoms and which is optionally substituted by hydroxyl, ethoxy or methoxy, or hydrogen, or $R_1$ a radical of the formula

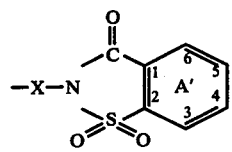
(1.1)

wherein X represents ethylidene or especially methylene, the ring A and/or A' is unsubstituted or substituted in the 5-position by methyl, in the 4-position by halogen or by a radical of the formula

(1.2)

wherein Q represents alkyl having 1 to 4 carbon atoms or preferably hydrogen, in the 6- or particularly 4-position by a radical of the formula

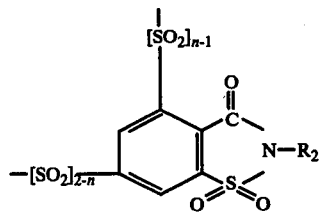
(1.3)

wherein n is 2 or preferably 1, and $R_2$ has the meanings given for $R_1$, or in the 4,5-position by a radical of the formula

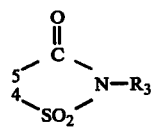
(1.4)

wherein $R_3$ has the meanings given for $R_1$; and if $R_1$, $R_2$ and/or $R_3$ are hydrogen the sulphonamide can also be present as hydrazonium salt or ammonium salt; and the materials treated in this manner are subsequently dried and subjected to a heat treatment.

If $R_1$ in the formula (1) represents a radical of the formula (1.1), symmetrical disulphonamides are preferably used in the process according to the invention, i.e. sulphonamides with unsubstituted rings A and A', or with rings A and A' which have the same substituents in the same positions.

Preferred sulphonamides correspond to the formula

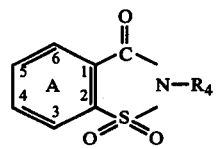
(2)

wherein $R_4$ represents phenyl substituted by ethyl, methyl, sulphonamido or carboxylamido, or unsubstituted phenyl, phenylethyl, benzyl or cyclohexyl, alkyl which has 1 to 8 carbon atoms and which is optionally substituted by hydroxyl, methoxy or ethoxy, or hydrogen, the ring A is unsubstituted or is substituted in the 4-position by a radical of the formula

$-SO_2NH_2$ (2.1), in the 6- or 4-position by a radical of the formula

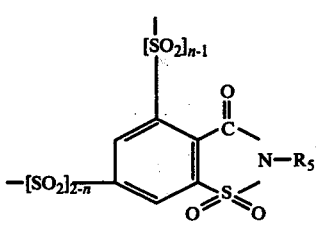
(2.2)

wherein n is 2 or 1, and $R_5$ has the meanings given for $R_4$, or in the 4,5-position by a radical of the formula

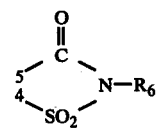
(2.3)

wherein $R_6$ has the meanings given for $R_4$; and if $R_4$ represents hydrogen the sulphonamide can be present also as ammonium salt.

Sulphonamides of the formula (1) which do not correspond to the sulphonamides of the formula (2) are likewise suitable for use in the process according to the invention.

Sulphonamides preferably used in the process according to the invention are those of the formula

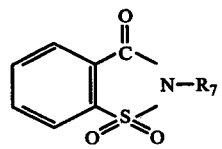
(3)

wherein $R_7$ represents phenyl, benzyl, phenylethyl or cyclohexyl, alkyl having 1 to 4 carbon atoms, or hydrogen; and if $R_7$ represents hydrogen the sulphonamide can be present also as ammonium salt.

Of particular interest are sulphonamides of the formula

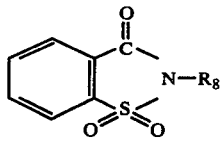

wherein $R_8$ represents phenyl, benzyl, cyclohexyl, ethyl, methyl or hydrogen; and if $R_8$ represents hydrogen the sulphonamide can be present also as ammonium salt.

Well suited sulphonamides correspond to the formula

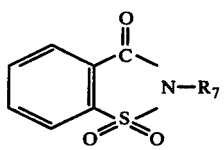

wherein $R_9$ represents phenyl, benzyl or especially hydrogen; and if $R_9$ represents hydrogen the sulphonamide can be present also as methylammonium salt, dimethylammonium salt, ethylammonium salt or as unsubstituted ammonium salt.

Like the sulphonamides of the formula (1), the sulphonamides of the formulae (2), (3), (4) and (5) too can be present as hydrazonium or preferably ammonium salts of saccharin provided $R_2$ to $R_9$ represent hydrogen. In the case of the ammonium ions, these can be the unsubstituted ammonium ion itself or substituted ammonium ions, e.g. substituted with cyclohexyl or especially with alkyl or hydroxyalkyl each having 1 to 4 carbon atoms, such as ions of n-butylammonium, ethylammonium, dimethyl- and diethylammonium, dimethylhydroxyethyl- and diethylhydroxyethylammonium, cyclohexylammonium and 2-ethylhexylammonium.

These ammonium salts are water-soluble products. Primarily of interest are the dimethylhydroxyethylammonium ion and the diethylhydroxyethylammonium ion, particularly the diethylammonium ion and the ethylammonium ion, the dimethylammonium ion and methylammonium ion, and especially the unsubstituted ammonium ion.

In the definitions of the R radicals, alkyl radicals are, e.g., n-octyl, 2-ethylhexyl, n-hexyl, preferably n-butyl, sec.-butyl, isobutyl, n-propyl, isopropyl and particularly ethyl and methyl. Q radicals in formula (1.2) are in particular ethyl and especially methyl. Preferred halogen substituents of the ring A are bromine and particularly chlorine. The ring A in the formula (1) is however preferably unsubstituted.

Suitable specific representatives of sulphonamides of the formula (1) are for example summarized in the following Table I.

| No. | $R_1$ in formula (1) | Substituents of Ring A in formula (1) |
|---|---|---|
| 1 | $-CH_3$ | — |
| 2 | $\ominus : H_3N^\oplus-CH_2CH_3$ | — |
| 3 | $\ominus : H_3N^\oplus-CH_2CH_2CH_2CH_3$ | — |
| 4 |  | — |
| 5 | $-CH_2-$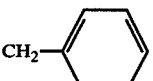 | — |
| 6 | $-H$ | — |
| 7 | $\ominus : H_3N^\oplus-$ | — |
| 8 | $\ominus : NH^\oplus_4$ | — |
| 9 | $-H$ | $4-SO_2NH_2$ |
| 10 | $-H$ |  |
| 11 | $-H$ |  |
| 12 | $\ominus : H_3N^\oplus-CH_2-\underset{\underset{CH_2CH_3}{\mid}}{CH}(CH_2)_3CH_3$ | — |
| 13 | $-CH_2-CH_3$ | — |
| 14 | $-(CH_2)_3-CH_3$ | — |
| 15 | $-CH_2-\underset{\underset{CH_2-CH_3}{\mid}}{CH}-(CH_2)_3-CH_3$ | — |

-continued

| No. | $R_1$ in formula (1) | Substituents of Ring A in formula (1) |
|---|---|---|
| 16 | 3-(SO$_2$NH$_2$)-phenyl- | — |
| 17 | 4-(SO$_2$NH$_2$)-phenyl- | — |
| 18 | 4-(CONH$_2$)-phenyl- | — |
| 19 | —: NH$_4^\oplus$ | 4-Cl |
| 20 | —: H$_3\overset{\oplus}{N}$—$\overset{\oplus}{N}$H$_3$ | — |
| 21 | —CH$_2$OH | — |
| 22 | —CH$_2$—N(phthalimide) | — |
| 23 | —: NH$_4^\oplus$ | NH$_4^\oplus$ : N$^\ominus$—C(=O)—...—S(=O)$_2$ ring (4-SO$_2$NH$_2$) |
| 25 | —CH$_2$-phenyl | — |
| 26 | $^\ominus$ : H$_3$N$^\oplus$—CH$_2$—CH$_2$—OH | |
| 27 | $^\ominus$ : HN$^\oplus$—(CH$_2$—CH$_2$OH)$_3$ | |

Compounds Nos. 2, 3, 7, 8, 12, 26 and 27 are ammonium salts, and compound No. 20 is a hydrazonium salt of acid saccharin (compound No. 6).

Particularly advantageous results are obtained with the compounds Nos. 4, 6 and 8 of Table I.

The sulphonamides of the formula (1) and the hydrazonium and ammonium salts thereof are known or are produced by known methods. They are produced, for example, by reaction of chlorosulphonic acid with toluene, subsequent conversion of the chlorosulphonate with ammonia or an amine into the sulphonamide, and oxidation of the methyl group with chromic acid or with KMnO$_4$ to an acid group, with the carboxylic acid-sulphonic acid-imide ring being immediately formed. With the amide formation with ammonia there is obtained an acid imide. The imide nitrogen atom can also be exchanged if the acid imide compound is heated with an amine having a boiling point of over 130° C.

A further production process comprises converting phthalic acid anhydride into phthalimide and phthalimide into anthranilic acid, diazotising the anthranilic acid and reacting the diazotised product with sodium sulphide/sulphur to dithiosalicylic acid, esterifying the dithiosalicylic acid with methanol, and reacting the esterified product by means of oxidating chlorination to methyl benzoate-o-sulphonic acid chloride and subsequently converting this with ammonia into the saccharin ammonium salt. Another method consists of oxidising o-chlorotoluene with sodium bichromate to give o-chlorobenzoic acid, subsequently reacting this with sodium sulphite to o-sulphobenzoic acid, esterifying this with methanol and reacting the esterified product with thionyl chloride or sulphuryl chloride to methyl benzoate-o-sulphonic acid chloride, and converting this with ammonia into the saccharin ammonium salt.

The compound No. 6 is known under the name of saccharin and the production thereof is described in detail in Ullmann Enzyclopadie, Vol. 16, p. 469–480 (3rd Edition 1965).

Sulphamidosaccharin is described in the "Zeitschrift fur angewandte Chemie," 39, 728–729 (1926). It is obtained by amidation of toluene-1-disulphochloride-2,4 and subsequent oxidation with permanganate of the corresponding diamide. The further saccharin derivatives used according to the invention likewise are described in the pertinent literature. For example, the m-bissaccharin which corresponds to the formula (1), wherein the ring A is substituted with the radical of the formula (1.4), is described in the U.S. Pat. No. 3,536,674. It is obtained by oxidation of m-xylene-4,6-disulphonamide with bichromate.

The sulphonamides of the formula (1) are solid crystallised compounds which are soluble or insoluble in water. Water-soluble products are applied to the fiber materials from aqueous solutions whereas water-insoluble products are applied from aqueous dispersions. Furthermore, the sulphonamides can also be applied from an organic solution.

With the application of water-insoluble sulphonamides from an aqueous dispersion, there are preferably concomitantly used dispersing agents of the type customarily used in the dyestuff and textile industries, e.g. lignin sulphonates, aromatic sulphonic acids, saturated-aliphatic dicarboxylic acids substituted with higher alkyl radicals, condensation products from aromatic sulphonic acids and formaldehyde, alkylphenol/ethylene oxide adducts, ethylene oxide adducts from fatty acids, fatty amines or fatty alcohols, sulphurated substituted benzimidazoles and sulphonated fatty acid amides. Good results are obtained in particular with lignin sulphonates, with ethylene oxide adducts from alkylphenols, fatty amines, fatty alcohols or fatty acids, and especially with substituted benzimidazoles or with condensation products from aromatic sulphonic acids and formaldehyde.

There are preferably employed those dispersing agents which at elevated temperature, e.g. at 180° C. to 220° C., cause no yellowing of the treated substrate, or at most a yellowing that can be removed by subsequent washing. In other words, the dispersing agents either should not decompose at elevated temperature or should merely form soluble or volatile decomposition products. The amount of dispersing agent used is preferably between 1 and 60 percent by weight, relative to the sulphoneamide. Particularly good results are obtained with 1 to 50, especially with 1 to 20, and particularly with 1 to 4 percent by weight of dispersing agent, relative to the sulphoneamide.

In order to increase storage stability, the aqueous suspensions or dispersions can also contain a protective colloid. The protective colloids customarily employed in industry are suitable, such as polyvinyl alcohol, polyvinylpyrrolidone, methylcellulose, carboxymethylcellulose, hydroxyethylcellulose or hydroxypropylcellulose, gelatine, acid casein, starch paste, or polymers of monomers of the acrylic acid series, such as polyacrylic acid, ethyl acrylate copolymers or methyl methacrylate copolymers. Good results are obtained in particular with polyvinyl alcohol, hydroxyethylcellulose and especially with carboxymethylcellulose.

The aqueous preparations contain as a rule 50 to 700 g/kg, preferably 200 to 700 g/kg, particularly 200 to 500 g/kg, of sulphonamide; 0 to 300 g/kg, preferably 0.2 to 200 g/kg, especially 5 to 40 g/kg, of dispersing agent; and 0 to 30 g/kg or 0.5 to 30 g/kg, preferably 0 to 10 or 0.5 to 10 g/kg of protective colloid. The amount is made up each time with water to 1 kg.

The sulphonamide of the formula (1) is advantageously ground as an aqueous dispersion in the presence of a dispersing agent to the extent that the particles have a mean diameter of 1 to 30$\mu$, preferably 1 to 20$\mu$. Good results are obtained in particular with dispersions of which the particle size is 1 to 10$\mu$, especially 1 to 5$\mu$. The particle size in itself has no influence on the attainable fireproofing effects, but does influence the stability of the dispersions.

The sulphonamides wet in different ways, so that it can be advantageous to suspend them in water not immediately before application but already well beforehand. Pure suspensions are however relatively unstable. There is therefore preferably added to the aqueous preparation a dispersing agent, since this prevents a rapid sedimentation of the solid sulphonamide. This sedimentation can be almost completely prevented by the further addition of a protective colloid. The protective colloids can be incorporated into the dispersion before or after grinding. Dispersions thus stabilised can if required be converted by drying in a manner known per se, e.g. in a spray dryer, into solid commercial preparations which can be redispersed at any time.

The grinding of the solid sulphonamides is performed in standard equipment suitable for the purpose, e.g. in a glass-ball mill, in a sand mill or in a corundum disk mill.

Suitable organic solvents for application of the sulphonamides of the formula (1) from an organic solution are aromatic hydrocarbons, e.g. benzene or toluene, particularly cycloaliphatic or heterocyclic hydrocarbons, e.g. dioxane or tetrahydrofuran, halogenated, preferably aliphatic, hydrocarbons, e.g. chloroform or trichloroethylene, and especially lower, preferably aliphatic, alcohols, e.g. methanol or ethanol, ketones, e.g. cyclohexanone, acetone or methyl ethyl ketone, esters, e.g. ethyl acetate or amides, e.g. dimethylformamide.

The process according to the invention is preferably performed by drying the fiber material after it has been treated with the aqueous fireproofing composition and subsequently subjecting the dried material to a heat treatment at elevated temperature. One suitable method comprises drying the treated material at temperatures up to 100° C., e.g. 70 to 100° C., and then subjecting it to a heat treatment above 100° C., e.g. at 100 to 220° C., or especially at 150 to 220° C., i.e. subjecting it to a thermosol treatment.

The fireproofing composition containing the sulphonamide of the formula (1) can be applied to the fiber materials by conventional methods, e.g. by spraying or printing, or preferably by the exhaust process, or particularly by padding.

The thermosol process is preferably performed at 175° C. to 220° C., and requires as a rule 10 to 200 seconds, preferably 20 to 100 seconds. Particularly good results are achieved with a time of 10 to 60 seconds.

Instead of being padded or subjected to the thermosol treatment, the materials may also be finished by the exhaust process under high-temperature conditions, e.g. at 100° C. to 130° C.

The process according to the invention is performed preferably in such a manner that, by suitable dilution of the fireproofing composition with water or with organic solvent, depending on the type of fiber material and on its weight per unit area, the deposit of sulphonamide of the formula (1), relative to the fiber material treated, is 1 to 20 percent by weight or, in particular, 1 to 10 percent by weight.

The polyamide fiber materials or especially the polyester fiber materials rendered fireproof according to the invention can be in any stage of processing, i.e. they can be treated in the form of staple or continuous filaments, in the form of fabrics or knitwear, in the dyed or undyed condition, or in the form of textiles which have already been further processed. Preferably however the material to be treated is always textile fiber material.

Suitable polyamide fibers are, e.g., those made from poly2-caprolactam, polyhexylmethylenediamine-adipate or poly-$\omega$-aminodecanoic acid.

Preferably however the fireproof finish is imparted to polyester fiber materials, which are derived in particular from terephthalic acid, e.g. poly(ethylene glycol terephthalate) or poly(1,4-cyclohexylenedimethyleneterephthalate).

There are obtained according to the invention on the fiber materials, especially on those made from polyester, preferably permanent fireproofing effects, which are retained after subsequent washing, and in most cases also after repeated washing in service or repeated dry cleaning. Furthermore, the tendency of the fabrics to become soiled in the dry state and wet state is not increased. The fastness to rubbing and especially to light is scarcely affected. Even fabrics printed with disperse dyes can be treated according to the invention without the quality of the printing becoming impaired.

A particular advantage of the process according to the invention is that good fireproofing effects are obtained with small deposited amounts.

The textile-mechanical properties of the treated fiber materials are moreover not, or only insignificantly, affected disadvantageously as a result of the present fireproofing finish. In particular the good handle properties of the treated fabrics are retained. An important advantage too is that the handle is found to be not only soft but in particular also not tacky. Also the low stiffness in flexure, the high resistance to abrasion and especially the high ultimate tensile strength of the finished fiber materials are particularly advantageous.

The process according to the invention can be performed also simultaneously with a process for dyeing or brightening fiber materials.

Percentage values in the following Examples are percent by weight.

INSTRUCTIONS FOR PRODUCING DISPERSIONS 200 g of sulphonamide of the formula (1) is suspended in a solution of 4 g of the sodium salt of a condensation product from naphthalenesulphonic acid and formaldehyde and 2 g of carboxymethylcellulose in 194 g of water. Grinding is performed in a sand mill until the mean particle diameter is 5 $\mu$. There is thus obtained a dispersion which is readily pourable and dilutable.

EXAMPLE 1

Blue-dyed polyester fabrics having a weight per unit area of 150 g/m$^2$ are padded with the aqueous liquors according to the following Table II, dried for 30 minutes at about 80° C., and subsequently subjected to a thermosol treatment for 20 seconds at 200° C.

The fabric is then washed for 5 minutes at 60° C. in a liquor containing per liter 2 g of anhydrous sodium carbonate and 1 g of a condensation product from 1 mole of p-nonylphenol and 9 moles of ethylene oxide. The material is subsequently rinsed and dried.

The fixation degree indicates the amount of product present on the fiber material after the subsequent washing treatment (relative to the amount present after the thermosol treatment).

The fabrics are afterwards washed for 45 minutes at 60° C., in a domestic washing machine, in a liquor containing per liter 4 g of a household detergent (SNV 198 861 - washing).

The individual fabric specimens are then tested with respect to their fireproofness (DIN 53 906, ignition time 3 seconds).

The results are given in the following Table II.

TABLE II

| Liquor designation | | untreated | Polyester fabrics treated with liquor | | | | | | | |
|---|---|---|---|---|---|---|---|---|---|---|
| | | | A | B* | C | D | E | F | G** | H*** |
| product No. according to Table I, % in dispersion: | 2 | | 31 | | | | | | | |
| | 3 | | | 100 | | | | | | |
| | 4 | | | | 25.5 | | | | | |
| | 5 | | | | | 30 | | | | |
| | 6 | | | | | | 30 | | | |
| | 7 | | | | | | | | | 100 |
| | 8 | | | | | | | 50 | | |
| | 12 | | | | | | | | 100 | |
| liquor absorption % | | | 85 | 85 | 80 | 80 | 80 | 85 | 85 | 85 |
| g of dispersion/kg of liquor | | | 284 | 88 | 346 | 313 | 313 | 176 | 88 | 88 |
| handle after subsequent washing | | 0 | 1¼ | 1½ | 1½ | 1 | 1 | 1½ | ½ | ½ |
| fireproofness | | | | | | | | | | |
| after thermosol treatment | | | | | | | | | | |
| burning time sec. | | | 0 | 0 | 0 | 14 | 1 | 0 | 1 | 0 |
| tear length cm. | | | 6.5 | 5 | 7.5 | 6.5 | 5 | 4.5 | 6 | 5.5 |
| after subsequent washing | | | | | | | | | | |
| burning time sec. | | | 0 | 0 | 0 | 2 | 0 | 0 | 16 | 2 |
| tear length cm. | | Burns | 5 | 5 | 5.5 | 4.5 | 4.5 | 4.5 | 7.5 | 5.5 |
| after 20 machine washings | | | | | | | | | | |
| burning time sec. | | | 0 | 0 | 0 | 1 | 0 | 0 | 0 | 7 |
| tear length cm. | | | 5.5 | 5 | 4 | 3.5 | 4 | 5 | 5.5 | 2.5 |
| after 40 machine washings | | | | | | | | | | |
| burning time sec. | | | 0 | 0 | 0 | 0 | 0 | 0 | 9 | 8 |
| tear length cm. | | | 5 | 5 | 5 | 4 | 4 | 4.5 | 5 | 9.5 |

Handle values:
0 unchanged,
1 fraction stiffer than 0,
2 somewhat stiffer than 0,
3 stiff,
4 very stiff.
*in the case of this liquor it is an ethanolic solution the % content of the "dispersior" is therefore given as 100.
**since the product is soluble in water, it is dissolved directly in the liquor and not used as dispersion
***in the case of this liquor it is a solution in dimethylformamide Similar results are obtained with the other compounds in Table I.

EXAMPLE 2

The procedure is carried out as in Example 1 except that a blue-dyed polyester fabric (weight per unit area 150 g/m$^2$) or an undyed polyamide fabric (weight per unit area 220 to 250 g/m$^2$) is padded with the liquors of the composition given in the following Tables III to VI.

The results of the fireproofing effects obtained (according to DIN 53 906, as measured in Example 1) are summarised in Tables III and IV for the polyester fabrics and in Tables V and VI for the polyamide fabrics.

TABLE III

| Liquor designation | | un-treated | Polyester fabrics treated with liquor | | | | |
|---|---|---|---|---|---|---|---|
| | | | I | J | K | L | M |
| product No. according to Table I, % in dispersion: | 16 | | 49 | | | | |
| | 17 | | | 42 | | | |
| | 20 | | | | 54 | | |
| | 21 | | | | | 37 | |
| | 22 | | | | | | 36 |
| liquor absorption % | | | 85 | 85 | 85 | 80 | 80 |
| g of dispersion/kg of liquor | | | 180 | 210 | 348 | 253 | 260 |
| handle after subsequent washing | | 0 | ½ | ½ | 0 | 1 | 1 |
| fireproofness | | | | | | | |
| after thermosol treatment | | | | | | | |
|   burning time sec. | | | 2 | 0 | 0 | 1 | 0 |
|   tear length cm. | | burns | 6 | 6 | 7 | 5.5 | 6 |
| after subsequent washing | | | | | | | |
|   burning time sec. | | | 1 | 0 | 0 | 0 | 1 |
|   tear length cm. | | | 5 | 5 | 6 | 5 | 5.5 |
| after 20 machine washings | | | | | | | |
|   burning time sec. | | | 5 | 2 | 0 | 0 | 0 |
|   tear length cm. | | | 5 | 5 | 5 | 4.5 | 5 |

TABLE IV

| Liquor designation | | un-treated | Polyester fabrics treated with liquor | | | |
|---|---|---|---|---|---|---|
| | | | N* | O** | P** | Q |
| product No. according to Table I, % in dispersion: | 13 | | 100 | | | |
| | 14 | | | 100 | | |
| | 15 | | | | 100 | |
| | 18 | | | | | 41 |
| liquor absorption % | | | 80 | 80 | 80 | 80 |
| g of dispersion/kg of liquor | | | 125 | 125 | 125 | 229 |
| flameproofness | | | | | | |
| after thermosol treatment | | | | | | |
|   burning time sec. | | | 0 | 0 | 0 | 12 |
|   tear length cm. | | burns | 6 | 6 | 6 | 8 |
| after 1 machine washing | | | | | | |
|   burning time sec. | | | 5 | 3 | 2 | 3 |
|   tear length cm. | | | 6 | 6 | 6 | 5.5 |
| after 5 machine washings | | | | | | |
|   burning time sec. | | | 0 | 2 | 3 | 9 |
|   tear length cm. | | | 6 | 6 | 6 | 4 |

TABLE V

| Liquor designation | | un-treated | Polyamide fabrics treated with liquor | | |
|---|---|---|---|---|---|
| | | | I | J | R |
| product No. according to Table I, % in dispersion: | 16 | | 49 | | |
| | 17 | | | 42 | |
| | 19 | | | | 30 |
| liquor absorption % | | | 75 | 75 | 80 |
| g of dispersion/kg of liquor | | | 408 | 238 | 313 |
| flameproofness | | | | | |
| after thermosol treatment | | | | | |
|   burning time sec. | | | 4 | 4 | 2 |
|   tear length cm. | | burns | 4 | 4 | 5 |
| after subsequent washing | | | | | |
|   burning time sec. | | | 3 | 4 | 4 |
|   tear length cm. | | | 5.5 | 3.5 | 4 |

TABLE VI

| Liquor designation | | un-treated | Polyamide fabrics treated with liquor | | | | | | |
|---|---|---|---|---|---|---|---|---|---|
| | | | N* | O** | P** | Q | S*** | T* | U* |
| product No. according to Table I, % in dispersion: | 13 | | 100 | | | | | | |
| | 14 | | | 100 | | | | | |
| | 15 | | | | 100 | | | | |
| | 18 | | | | | 41 | | | |
| | 25 | | | | | | 100 | | |
| | 26 | | | | | | | 100 | |
| | 27 | | | | | | | | 100 |
| liquor absorption % | | | 80 | 80 | 80 | 80 | 80 | 80 | 80 |
| g of dispersion/kg of liquor | | | 125 | 125 | 125 | 229 | 108 | 284 | 284 |
| flameproofness | | | | | | | | | |
| before thermosol treatment | | | | | | | | | |
|   burning time sec. | | | 0 | 0 | 0 | 5 | 1 | 1 | 1 |
|   tear length cm. | | burns | 4 | 4.5 | 4 | 4.5 | 4.5 | 4.5 | 5 |
| after thermosol treatment | | | | | | | | | |
|   burning time sec. | | | 0 | 1 | 1 | 4 | 1 | 0 | 0 |

TABLE VI-continued

| Liquor designation | un-treated | Polyamide fabrics treated with liquor | | | | | | |
|---|---|---|---|---|---|---|---|---|
| | | N* | O** | P** | Q | S*** | T* | U* |
| tear length cm. | | 3.5 | 4 | 4 | 4.5 | 4 | 4.5 | 6 |

*since the product is soluble in water, it is dissolved directly in the liquor and not used as dispersion
**in the case of this liquor it is a solution in ethyl acetate; the % content of the "dispersion" is therefore given as 100
***this liquor is a solution in dimethylformamide Similar results are obtained with the other compounds in Table I and with the thermosol treatment at 180° C. for 20 or 40 seconds, or at 200° C. for 40 seconds.

EXAMPLE 3

In the one case there is used a polyester fabric having a weight per unit area of 130 g/m², which is dyed yellow with the disperse dye of the formula

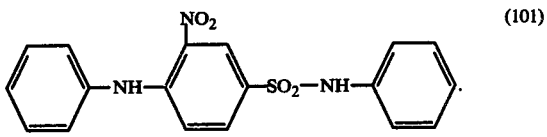
(101)

In the other case the fabric is padded with an aqueous liquor containing per liter 35 g of the optical brightener of the formula

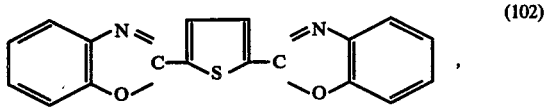
(102)

the liquor absorption being 80%. After drying of the padded fabric, it is subjected to the thermosol treatment for 20 seconds at 200° C.

The dyed and/or optically brightened fabric is subsequently padded with aqueous liquors which in each case contain per liter 75, 100 and 125 g of the product No. 8 according to Table I. The liquor absorption is again 80%.

The padded fabric is dried at 80° C. for 30 minutes, and then subjected to the thermosol treatment for 20 seconds at 200° C.

The fabric is subsequently washed as given in Example 1, and subjected to up to 10 service washings in the washing machine; it is then tested for fireproofness. Furthermore, measurements are made after subsequent washing to determine the ultimate tensile strength of the fabric sample in the weft direction according to ASTM D 1424–63, and the degree of whiteness of the fabric sample (see R. Griesser in "Textile Detergents" 12[2], 93–100 (1975)) before and after the subsequent washing, and also before and after 320 hours of irradiation with the Fade-O-meter Type FDA-RC (manufacturer: Atlas Electric Devices Company, Chicago, USA, carbon UV lamp with maximum emission between 3600 and 4200 Å).

Also tested is the fastness to light of the dyeing on the fabric sample after subsequent washing (according to SNV 195 809). According to SNV 195 809, the fastness to light is expressed by a numerical rating, with 8 being the best rating and 1 the poorest.

The results of these tests are summarised in the following Table VII.

TABLE VII

| Liquor designation | Treated polyester fabric | | | Un-treated fabric |
|---|---|---|---|---|
| | V | W | X | |
| g of product No. 8 according to Table I per kg of liquor | 75 | 100 | 125 | 0 |
| fireproofness of the dyed fabric after subsequent washing | | | | |
| burning time sec. | 2 | 1 | 25 | 4 |
| tear length cm. | 5 | 5 | 5 | 13.5 |
| after 1 machine washing | | | | |
| burning time sec. | 0 | 0 | 0 | 22 |
| tear length cm. | 5 | 6 | 4.5 | 13 |
| after 10 machine washing | | | | |
| burning time sec. | 0 | 0 | 0 | 25 |
| tear length cm. | 4.5 | 4.5 | 4.5 | 12.5 |
| ultimate tensile strength (%) of the dyed fabric | 103 | 102 | 105 | 100 |
| degree of whiteness of the brightened fabric | | | | |
| without fade-o-meter irradiation after subsequent washing | 164 | 155 | 149 | 176 |
| after 620 hours of fade-o-meter irradiation after thermosol treatment | 140 | 129 | 114 | 162 |
| after 620 hours of fade-o-meter irradiation after subsequent washing | 141 | 141 | 140 | 162 |
| fastness to light rating for the yellow dyeing of the dyed fabric | 6–7 | 6–7 | 6 | 6–7 |

Similar results for fastness to light and degree of whiteness are obtained when the dye of the formula (101) and the brightener of the formula (102) are replaced by other commercial disperse dyes and optical brighteners, respectively.

Similar results are likewise obtained with the other compounds in Table I.

We claim:

1. A process for fireproofing fiber materials made from polyester, which comprises treating these materials with a preparation containing a sulphonamide of the formula

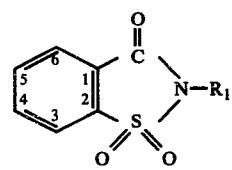
(I)

wherein $R_1$ is phenyl, phenylethyl, benzyl or cyclohexyl, alkyl with 1 to 8 carbon atoms which is unsubstituted or substituted by hydroxyl, ethoxy or methoxy, or hydrogen, or $R_1$ is a radical of the formula

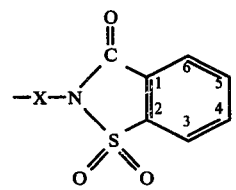

wherein X is ethylidene or methylene, and if $R_1$ is hydrogen the sulphonamide can also be present in the form of a hydrazonium methylammonium, dimethylammonium, ethylammonium or unsubstituted ammonium salt; and drying the material treated in this manner at 70° to 100° C., and subsequently subjecting it to a thermosol treatment at 150° to 220° C.

2. A process according to claim 1, in which there is used a sulphonamide on the formula

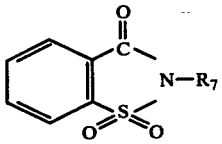

wherein $R_7$ is phenyl, benzyl, phenylethyl or cyclohexyl, alkyl with 1 to 4 carbon atoms, or hydrogen,; and if $R_7$ is hydrogen the sulphonamide can be present also in the form of a methylammonium, dimethylammonium, ethylammonium or unsubstituted ammonium salt.

3. A process according to claim 1, in which there is used a sulphonamide of the formula

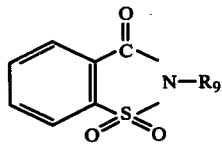

wherein $R_9$ is phenyl, benzyl or hydrogen; and if $R_9$ is hydrogen the sulphonamide can be present also in the form of a methylammonium salt, dimethylammonium salt or ethylammonium salt, or as unsubstituted ammonium salt.

4. A process according to claim 1, in which the compound of the formula

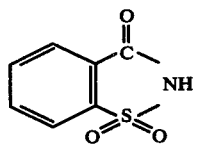

is used.

5. A process according to claim 1, wherein the sulphonamide of the formula (1), wherein $R_1$ is phenyl is used.

6. A process according to claim 1, wherein the sulphonamide is used in the form of the ammonium salt.

7. A process according to claim 1, in which the fiber materials are treated with an aqueous preparation which contains, in addition to the sulphonamide, a dispersing agent, said dispersing agent is added only when said sulphonamide is not a salt.

8. A process according to claim 7, in which the fiber materials are treated with an aqueous preparation which contains, in addition to the sulphonamide, a dispersing agent and a protective colloid.

9. A process according to claim 8, in which the aqueous preparation contains per kg 50 to 700 g of the sulphonamide, 0.2 to 200 g of dispersing agent and 0 to 30 g of protective colloid.

10. A process according to claim 1, wherein the sulphonamide which is not a salt is present in powder form and has a mean particle diameter of 1 to 30μ.

11. A process according to claim 1, in which the fiber material is treated by the padding method or by the exhaust method.

12. The fiber material made from polyester bearing thereon a flameproofing finish which is obtained by the process according to claim 1.

* * * * *